Figure 1:
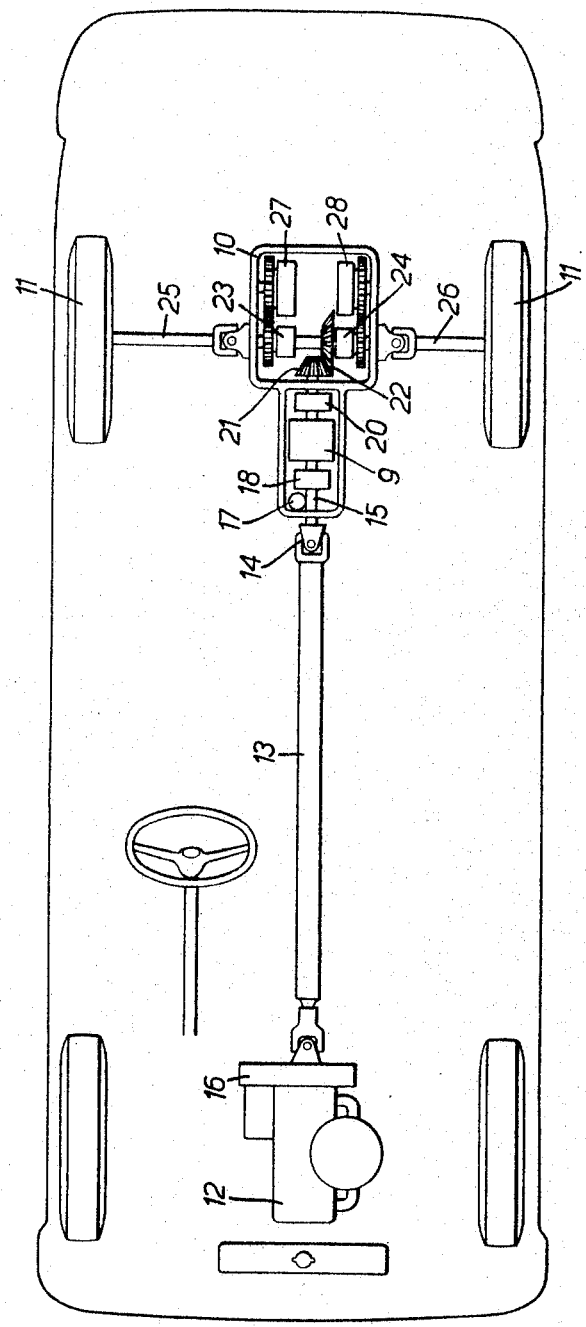

INVENTOR
WILLIAM CULL
BY
Irvin S. Thompson
ATTORNEY

INVENTOR
WILLIAM CULL
BY Irwin S. Thompson
ATTORNEY

United States Patent Office 3,320,829
Patented May 23, 1967

3,320,829
TRANSMISSION SYSTEMS
William Cull, Hest Bank, near Lancaster, England, assignor of one-half to Cull Development Limited, London, England
Filed Dec. 31, 1963, Ser. No. 334,874
Claims priority, application Great Britain, Jan. 2, 1963, 184/63
3 Claims. (Cl. 74—720.5)

This invention relates to transmission systems, and in particular to hydrostatic shunt transmission systems for motor vehicles.

Hydrostatic shunt transmission systems are sometimes referred to as being of the "split torque" type and were developed to overcome the major disadvantage of a pure hydrostatic drive which is relatively low efficiency in all drive conditions due to hydraulic losses, and to this end a hydrostatic shunt transmission system normally provides a mechanical drive at all drive conditions and a proportion of the power passing through the hydraulic section of the system is recirculated or used in parallel with the mechanical drive. As only a small part of the available power is subject to hydraulic losses the efficiency of such a system is relatively high. It follows that maximum efficiency is obtained when the hydraulic section is transmitting no power, and the design may be such that this condition occurs over the most advantageous part of the vehicle speed range. As with all hydrostatic transmission systems a hydraulic pump/motor driven by the power unit, normally an internal combustion engine, is connected in a closed hydraulic circuit with at least one hydraulic pump/motor associated with the final drive to the vehicle wheels.

Each pump/motor can operate either as a pump or a motor according to the direction in which the hydraulic power is transmitted which will depend upon operating conditions, but generally the unit coupled to the engine operates as a pump and the other unit or units operate as motors and are referred to as such hereinafter. The pump or each motor, or both, may be of variable capacity type.

According to the invention a hydrostatic shunt transmission system between an input shaft and two output shafts, comprises a mechanical drive in combination with a hydrostatic drive, the mechanical drive including a reduction gear connected to the input shaft, and arranged to drive the input members of two differential gear units, the output member of each differential gear unit being connected to one of the output shafts, and the reaction member of each differential gear unit being connected to a separate hydraulic motor.

The transmission system preferably includes a hydraulic pump driven by the input shaft, and connected in a closed hydraulic circuit with each of the hydraulic motors.

The hydraulic pump, and/or the motors, are desirably of variable capacity type, and also preferably reversible, that is to say the direction of flow can be reversed without reversing the direction of rotation.

In one form of the invention, the reduction ratio of the reduction gear is at least 2:1, and may be more than 3:1, and the reduction ratio of each differential gear unit is at least 3:1, the overall reduction ratio being at least 8:1.

According to another preferred feature of the invention the transmission system includes clutch means between the input shaft and the reduction gear, to permit the mechanical drive to be interrupted, and brake means acting on the input members of the differential gear units, so that the hydraulic motors can drive the output shafts.

Figure 2:
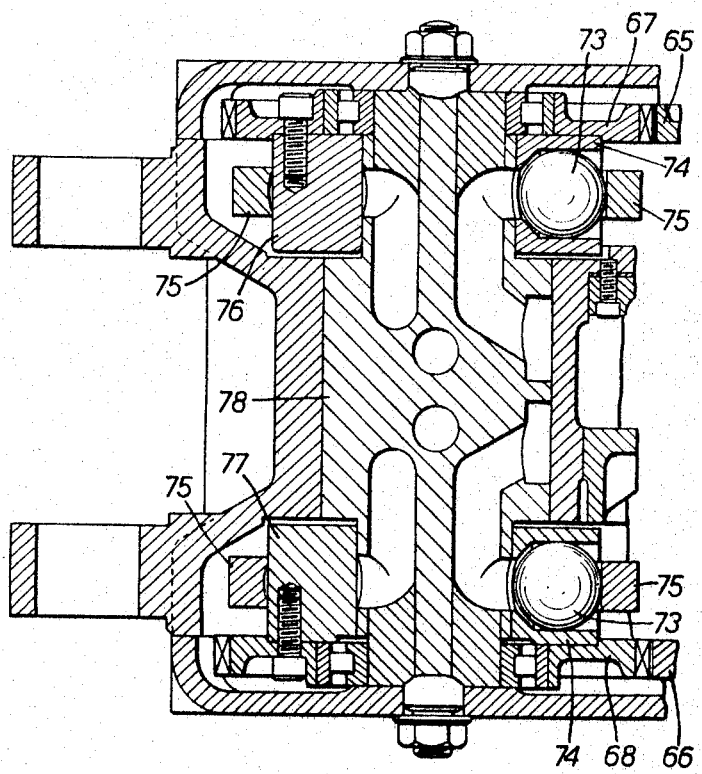
Figure 3:
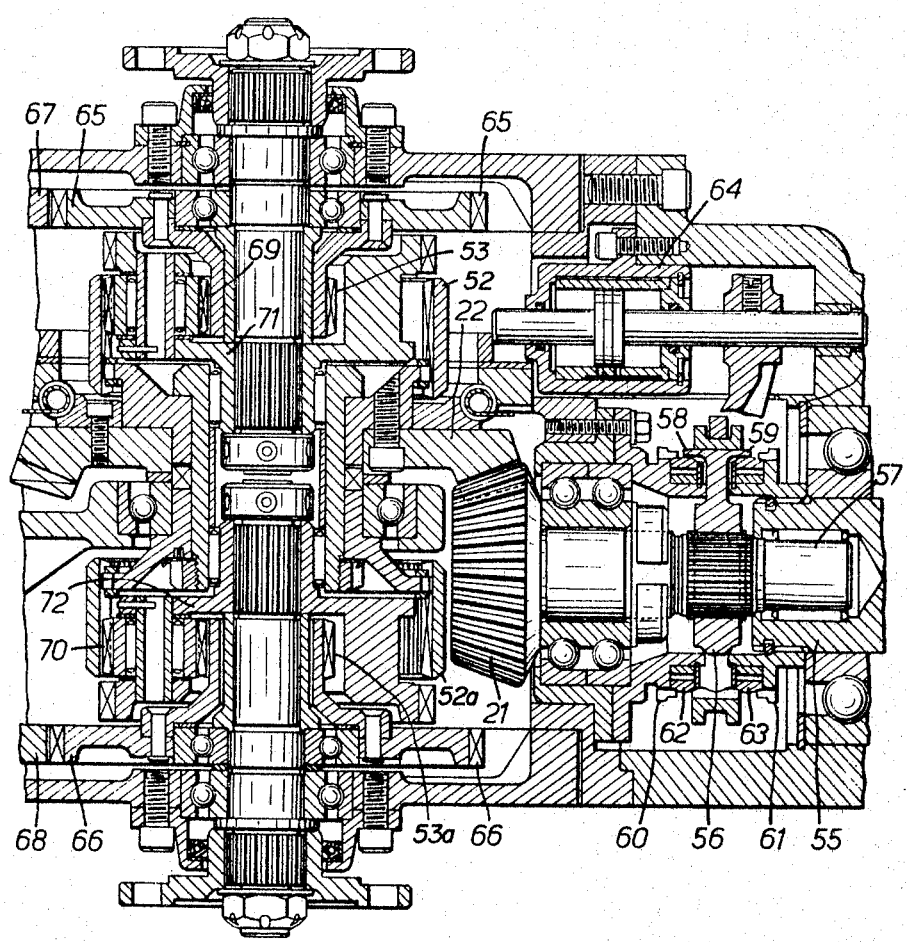
Figure 4:
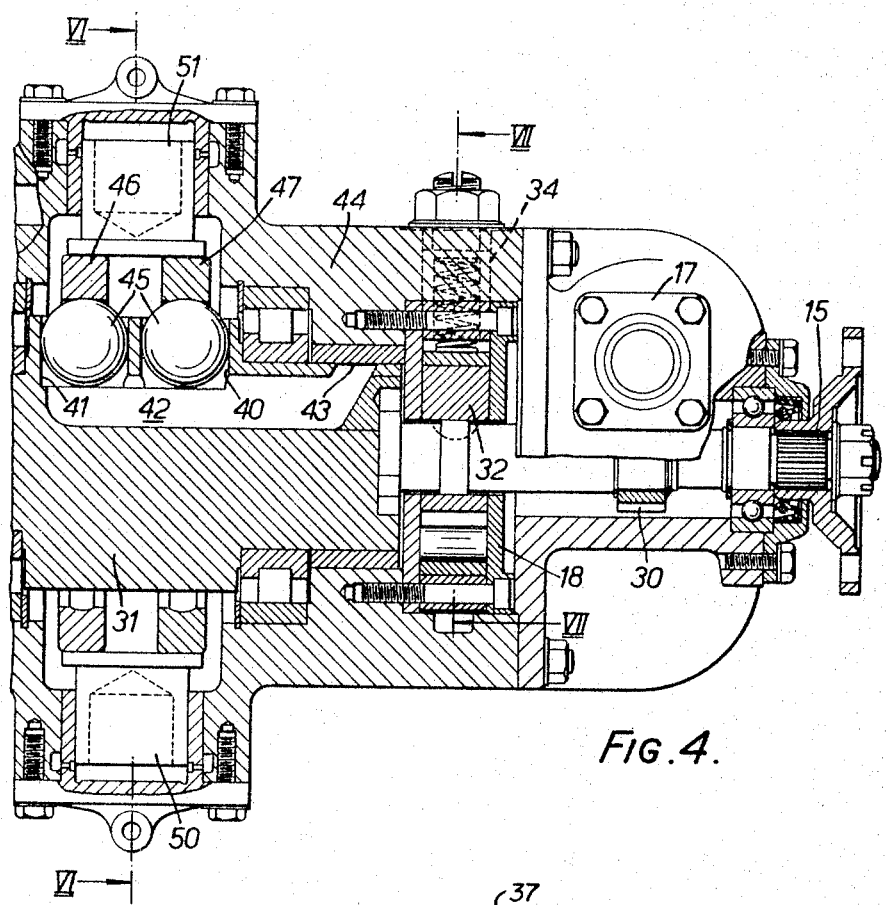
Figure 7:
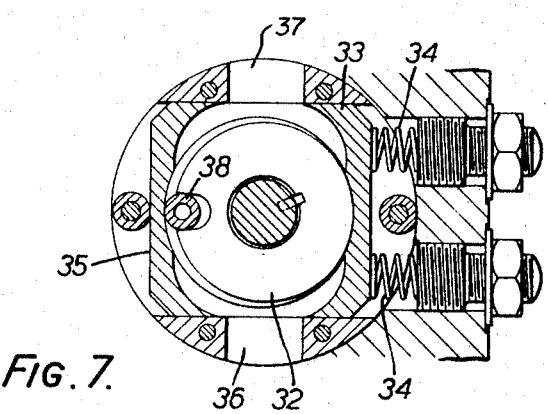
Figure 5:
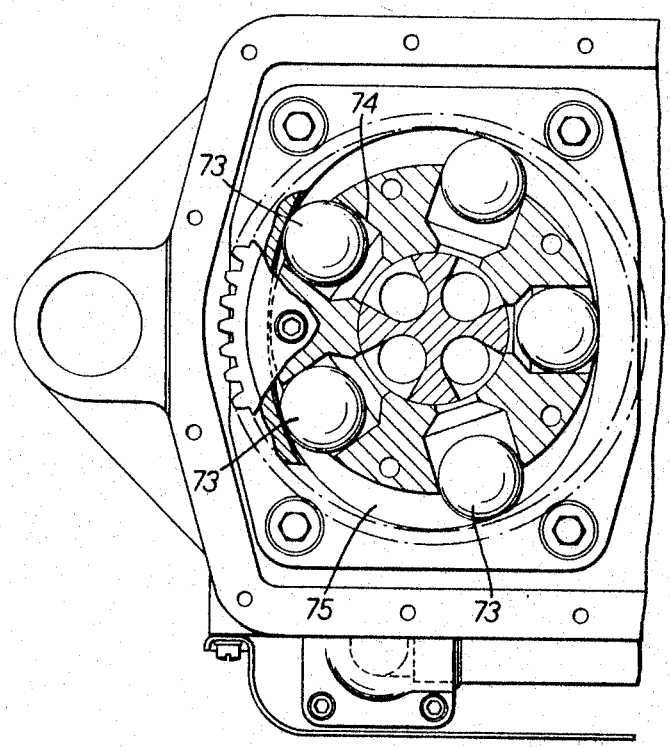
Figure 6:
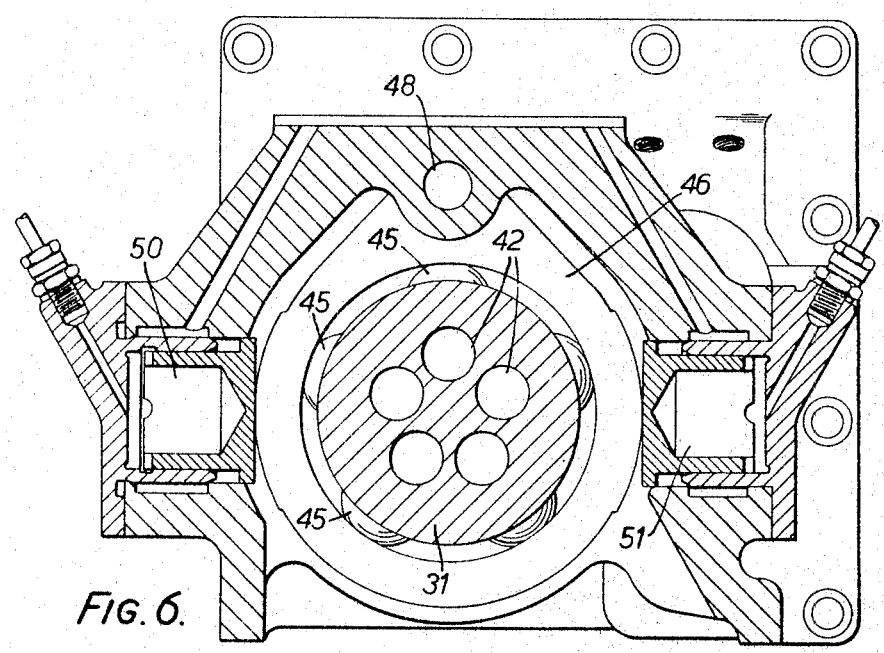
Figure 8:
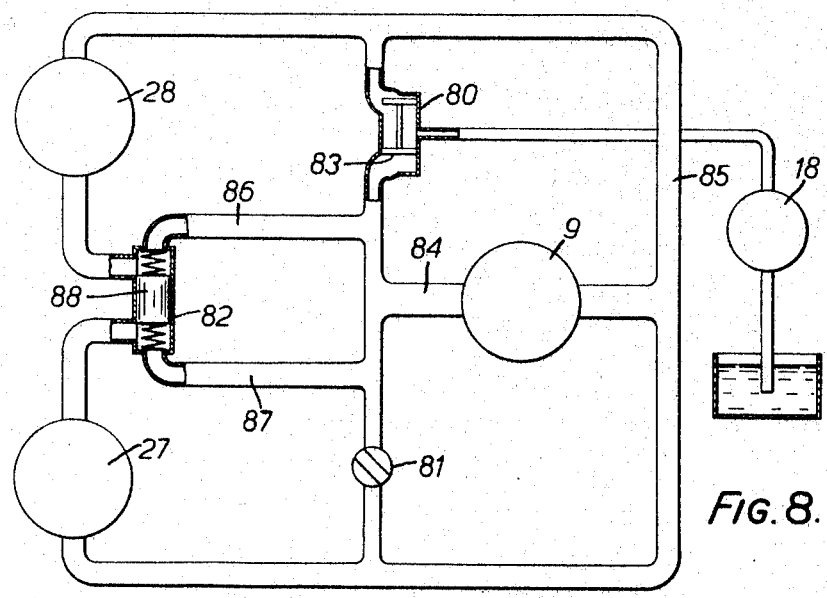

The invention may be performed in various ways but a hydrostatic shunt transmission system representing one embodiment of the invention as applied to a rear drive vehicle will now be described by way of illustration and example, with reference to the accompanying drawings, in which:

FIGURE 1 is a diagrammatic plan view of an automobile power plant including a transmission assembly in accordance with the invention, FIGURES 2, 3, and 4 are adjoining sectional plan views of a constructional form of transmission assembly, FIGURE 2 showing the hydraulic motors, FIGURE 3 showing the two epicyclic differential gear units and combined clutch and brake device, and FIGURE 4 showing the main hydraulic pump, the feed pump and governor, FIGURE 5 is a side elevation of the hydraulic motor unit as shown in FIGURE 2, with the end casing and part of the motor removed to show the radial ball piston construction, FIGURE 6 is a sectional end elevation through the main hydraulic pump on the line VI—VI in FIGURE 4, FIGURE 7 is a sectional end elevation through the feed pump on the line VII—VII in FIGURE 4, and FIGURE 8 is a diagrammatic illustration of the hydraulic circuit of the hydrostatic drive.

In the motor vehicle illustrated in FIGURE 1 the main elements of the transmission system are housed in a single casing 10 between the two rear wheels 11, and the system is driven from an engine 12 at the front of the vehicle, through a propeller shaft 13. Alternatively the engine may be constructed as a unit with the transmission system, and the whole unit may be situated at the front or rear of the vehicle, and may be arranged to drive the front or rear wheels.

As shown in FIGURE 1, the propeller shaft 13, which is driven directly from the engine flywheel 16, is coupled through a universal joint 14 to the transmission input shaft 15, which drives a governor 17, a make-up or feed pump 18, and a main variable capacity hydraulic pump 9 of the reversible type, forming part of the hydrostatic drive. The shaft 15 is connected to a combined clutch and brake device 20, the output of which is connected to a hypoid bevel pinion 21 engaging a crown wheel 22 and constituting a reduction gear. The shaft on which the crown wheel is mounted is connected to the input members of two separate epicyclic differential gear units 23, 24, the output member of each gear unit being connected through a universal joint to the respective drive shaft 25, 26, in turn connected to the associated rear wheel. The reaction member of each differential gear unit is connected through gearing to one of two separate hydraulic motors 27, 28.

As shown in FIGURE 8 the main hydrauilc pump 9 is connected in two closed hydraulic circuits, each including one of the motors 27, 28, so that, depending upon the setting of the pump controls, the motors will either drive or be driven by the reaction members of the differential gear units, and so will determine the overall transmission ratio between engine and road wheels.

Referring now to FIGURES 2 to 7 of the drawings, the input shaft 15 drives the governor 17, through a skew gear drive 30, and the hydraulic make-up pump 18 is mounted directly on the shaft 15, followed by the rotor 31 of the main hydraulic pump 9. The hydraulic governor 17 is of a generally known kind, providing an output pressure signal which is responsive to the speed of rotation of the shaft 15. This output pressure signal is combined with or modified by a further pressure signal obtained for example from a manual accelerator control in the vehicle, and the resultant pressure used to control the setting of the pump 9. The details of the governor and control system however form no part of the present invention and are not described or illustrated.

The make-up pump 18, which is also illustrated in cross-section in FIGURE 7, comprises a rotor 32 keyed to the shaft and rotating in a casing 33 which is free to slide horizontally in guides, being urged towards an eccentric position by a pair of springs 34, which oppose the output pressure from this pump acting on the opposite side 35 of the casing. The pump inlet 36 is at the bottom of the pump, and the outlet 37 at the top. The rotor 32 carries a roller "piston" 38 which can move radially in a slot in the rotor, and engages the internal surface of the casing to act as a piston or vane. The clearance between the rotor and the casing, on the side adjacent to the springs 34 automatically varies as the pump output pressure varies, and the arrangement is such that as the output pressure rises the pump delivery rate falls, until at the predetermined feed pressure the casing is concentric with the rotor and there is no delivery from the pump.

The main hydraulic pump 9 and the motors 27, 28 are basically of similar construction, being of the radial ball piston type. The pump 9 comprises the rotor 31 formed with two banks of five radial cylinders 40, 41 which are mounted side by side and thus rotate with the input shaft 15. Inlet and outlet ports 42, communicate with the inner ends of the cylinders in tandem and are led out to valve ports 43 in a cylindrical part of the pump rotor body which communicate with corresponding ports in the casing 44 in which the pump rotor body is mounted. The ball pistons 45 of each cylinder bank bear radially outwardly on a corresponding one of two eccentric control rings 46, 47, the eccentricity of which controls the pump output and which are pivotally mounted on a pivot pin 48 (see FIGURE 6) to control the volumetric delivery rate, and the direction of flow, of the pump. The eccentricity and hence the pump output is varied by a hydraulic servo device having rams 50, 51, which move the control rings 46, 47, together, to vary the piston stroke from maximum "plus" (i.e. in one direction) through zero to maximum "minus" (i.e. in the opposite direction).

The pump rotor 31 has a rearwardly projecting shaft 55 which is coupled through the clutch and brake device to the bevel pinion 21. As shown in FIGURE 3 there is a clutch sleeve 56 splined to the shaft 57 on which the bevel pinion is fixed. This sleeve has teeth or dogs 58, 59 on opposite sides thereof, which can be engaged selectively with teeth 60, formed on a part which is bolted to the main casing, and teeth 61 on a part which is splined to and rotates with the pump rotor 31, and hence also the input shaft 15. Synchronising rings 62, 63 are provided adjacent to each of the sets of teeth 60, 61, so as to be engaged by the internal surface of the sleeve 56 before the teeth engage. The sleeve is moved axially by a double-acting hydraulic ram 64, to which hydraulic fluid is admitted under the control of a manual control valve conveniently positioned for the driver of the vehicle. In a central neutral position of the sleeve both the teeth 59, 61 (which act as a positive clutch) and also the teeth 58, 60 (which act as a positive brake or lock) are disengaged.

As shown in FIGURE 3, the bevel pinion 21 meshes with a crown wheel 22 which is directly coupled to the annuli 52, 52a, of the two epicyclic differential gear units 24, 23. Each gear unit includes a sun pinion 53, 53a, which constitutes the reaction member of the gear and is connected respectively to a pinion 65, 66, which meshes with a further pinion 67, 68, attached to one of the two hydraulic motors 27, 28. Planet pinions 69, 70 are mounted on planet carriers 71, 72, which are connected to the two output shafts 25, 26.

Each hydraulic motor 27, 28 has a fixed capacity per revolution equal to the maximum output per revolution of the pump 9. As seen in FIGURES 2 and 5, each motor has five ball pistons 73 arranged in five radial cylinders 74 and bearing radially outwardly on a two-lobed cam ring 75. Thus the cam ring imparts to the pistons two working strokes per motor revolution as against the single piston stroke per pump revolution imparted by the eccentric pump control rings 46, 47. The cylinder block 76, 77 of each motor is bolted directly to the respective pinion 67, 68 of the gear drive from the corresponding sun gear. The motors are arranged in alignment at the rear of the casing 10 directly behind the epicyclic units and a stationary valve block or pintle 78 common to both motors and on which the cylinder blocks revolve, is fixed in the casing and bolted between side walls thereof.

A feature of the control rings 46, 47 of the pump 9 and the cam rings 75 of the motors is that the tracks on which the ball pistons bear are slightly arcuate in section to provide a self-centering action axially of the pump or motors, and the two pump control rings 46, 47 are allowed a small degree of freedom so that they tend to "float." In the case of the motors the cam rings are fixed, and the cylinder blocks 76, 77 are able to float axially to a small extent on roller bearings on which the blocks are mounted.

The hydraulic circuit, shown diagrammatically in FIGURE 8, is of the closed type and is duplicated for the two motors, and each of two component circuits from the common pump feeds one of the motors. The make-up pump 18 acts to maintain a pressure in the circuit lying within a predetermined range and hence makes good any loss of fluid which may occur due to leakage. As previously described athe pump output depends upon the output pressure and is zero when no make-up is required. This is preferable to the provision of a relief valve which merely spills excess pressure back to the oil source while the pump output remains at a fixed level.

The hydraulic section of the system incorporates three principal valves 80, 81, 82. Valve 80 is a delivery selector valve associated with the make-up pump 18. Under normal driving conditions one side of the hydraulic system is at high pressure and the other side is at a relatively low pressure, the direction of flow being reversed according to the conditions. On the overrun, i.e. with the wheels driving the engine, the high pressure changes over from one side of the hydraulic circuit to the other and consequently it is essential to ensure that the delivery from the make-up pump is always supplied to whichever side of the hydraulic circuit is at low pressure. This is the function of the delivery selector valve 80 which has a valve spool 83 to the centre of which the make-up pump output is fed. The ends of the spool are respectively open to the pressures in the two sides 84, 85 of the hydraulic circuit, and high pressure on one side forces the spool over so that the valve connects the make-up pump output to the other or low pressure side.

Valve 81 is a starting valve which is a simple by-pass valve under the control of the governor pressure. At engine idling speed the starting valve remains open and the hydraulic fluid circulates freely through the starting valve which interconnects the input and output of the pump 9 and hence off-loads the latter. As the engine speed rises the governor pressure increases and at a convenient speed, normally in the region of 800 to 900 r.p.m., the starting valve gradually closes to connect the pump to the motors. The gradual closing of the valve ensures that the drive is taken up gently until the valve is fully closed and the by-pass action ceases.

The third valve 82 is a wheel slip limiting valve which is connected between the two sides 86, 87 of the hydraulic motor circuits which are at high pressure under normal driving conditions, the valve being so connected close to the motors. A pressure drop in either of the hydraulic lines to which the slip limiting valve is connected, resulting from loss of driving torque at one of the wheels due to slip, causes the valvespool 88 to move over in proportion to the pressure differential between the two high pressure lines. Such movement of the valve acts to throttle the line in which the pressure drop has occurred so that the pressure builds up in that the side of the valve remote from the corresponding motor until the valve reaches a balanced position. The throttling action reduces the supply to the motor associated with the slipping wheel.

In normal circumstances the slip limiting valve remains in a balanced central position and has no effect on the operation of the transmission system which acts to supply the drive to each wheel in much the same way as with a conventional mechanical differential so that, for example, the outer driving wheel turns faster than the inner driving wheel when rounding a bend. However, the system has the marked advantage that should wheel slip occur and either wheel lose traction the slip limiting valve immediately comes into operation to ensure that the drive is maintained through the non-slipping driven wheel, whereas with a conventional mechanical differential if one wheel slips the other wheel loses all driving action. In normal forward drive there is always a mechanical connection between the engine and the driving wheels; but for low ratio forward and reverse gears the drive is purely hydraulic with the fixed reduction gear locked.

The pump servo control is such that the pump capacity correctly adjusts itself to engine speed and accelerator pedal position to provide the desired drive characteristics.

When starting from rest, on a normal level surface for forward drive (the dog clutch sleeve 56 is moved from the neutral to the forward position to complete the mechanical drive. The planet carriers 71, 72 of the differential units are at rest with the wheels, and hence the drive is transmitted to the sun gears 63, 64, which drive the hydraulic motors 27, 28 in the reverse direction so that they act as pumps. Increasing engine revolutions causes the starting valve 81 to close gradually, and the resistance of the motors 27, 28 acting as pumps gradually overcomes the starting resistance of the driven wheels and the planet carriers begin to rotate, producing forward vehicle movement.

On closing of the starting valve 81 the output of the main pump 9 automatically adjusts itself according to engine speed and accelerator position. Maximum power requirements will set the pump at "maximum minus." As the resistance decreases the pump setting moves towards zero and the speed of the motors decreases until the point at which the sun gears are stationary. During this phase a proportion of the power reaching the epicyclic gears is fed back through the motors to the pump, thus augmenting the torque to the wheels.

With the sun gears 53, 53a stationary, the overall transmission ratio between engine and wheels is subject to two fixed reductions, that of the bevel reduction gear 21, 22, and that of the epicyclic trains with fixed sun gears. From this point, as circumstances permit, the pump delivery continues to move towards "maximum plus." The pump, which has hitherto been motored by the motors acting as pumps now starts to pump, reversing the direction of the motors 27, 28 so that they motor and drive the sun gears in the same direction as the annuli 52, 52a. The effect of this is to reduce the reduction ratio of the epicyclic trains until the point is reached at which there is no epicyclic reduction, and the overall ratio is that of the reduction gears alone. During this phase part of the power from the engine is diverted through the hydraulic system and reintroduced to the drive line through the sun gears.

It is possible to increase the speed of the motors further until a step-up ratio on the epicyclic trains begins to offset the reduction of the bevel gears. The limiting factor to this step-up ratio is pump capacity and the practical necessity of keeping the hydraulic pressure within certain limits.

To obtain reverse drive the dog clutch sleeve 56 is moved to the rearward position, engaging teeth 58 and 60, and locking the reduction gear and hence the annuli of the differential units to the casing, while leaving the pump 9 driven by the engine. With the starting valve 81 closed, and the pump 9 set in the "plus" condition, the two motors 27, 28 are driven hydraulically and turn the road wheels 11 in the reverse direction through the reduction ratio provided by the epicyclic gear trains with fixed annuli. Thus in reverse drive there is no mechanical connection between the engine and driven road wheels and the drive is a "pure" hydrostatic drive.

To obtain a low ratio forward drive the dog clutch is placed in the rearward position, as for reverse drive, and the pump 9 is set in the "minus" condition. This causes the motors 27, 28 to rotate in the opposite direction, providing a low ratio pure hydrostatic drive in the forward direction.

The reduction ratio of the epicyclic gears with the annuli fixed, is 3.5:1 and the overall reduction ratio between the input shaft and each output shaft is 8.5:1 in this example, or in another example may be 13.5:1.

I claim:

1. A hydrostatic shunt transmission system between an input shaft and two output shafts, comprising a mechanical drive in combination with a hydrostatic drive, the mechanical drive including a reduction gear connected to the input shaft, and arranged to drive the input members of two differential gear units the output member of each differential gear unit being connected to one of the output shafts with a reaction member of each differential gear unit connected to a separate hydraulic motor, the hydrostatic drive including a hydraulic pump driven from the input shaft, and connected in two parallel hydraulic circuits with the hydraulic motors, and means responsive to a substantial pressure drop in either of said parallel hydraulic circuits to throttle the circuit in which said pressure drop occurs.

2. A transmission system as claimed in claim 1, said throttling means comprising a valve spool movable in one direction to throttle the circuit of one said hydraulic motor and movable in the opposite direction to throttle the circuit of the other said hydraulic motor.

3. A transmission system as claimed in claim 2, and spring means yieldably bearing against opposite ends of said valve spool to urge said valve pool toward a rest position in which the valve spool is centered between said parallel hydraulic circuits.

References Cited by the Examiner

UNITED STATES PATENTS

| | | | |
|---|---|---|---|
| 1,984,830 | 12/1934 | Higley | 74—720.5 X |
| 1,991,094 | 2/1935 | Higley | 74—720.5 X |
| 2,588,750 | 3/1952 | Nims et al. | 74—686 |
| 2,588,751 | 3/1952 | McCain | 74—686 |
| 2,804,016 | 8/1957 | Moore | 180—66 X |
| 2,833,362 | 5/1958 | Martin | 180—66 |
| 2,874,591 | 2/1959 | Thoma | 74—687 X |
| 2,896,479 | 7/1959 | Kelbel | 74—781 |
| 2,901,922 | 9/1959 | Baker | 74—687 |
| 3,129,781 | 4/1964 | Stein | 180—66 X |
| 3,177,964 | 4/1965 | Anderson | 74—731 X |

DAVID J. WILLIAMOWSKY, *Primary Examiner.*

J. R. BENEFIEL, *Assistant Examiner.*